Aug. 18, 1964  G. EINAUDI ETAL  3,144,703
METHOD OF MANUFACTURING ROLL CAGES FOR NEEDLE BEARINGS
Filed Nov. 20, 1962  4 Sheets-Sheet 1
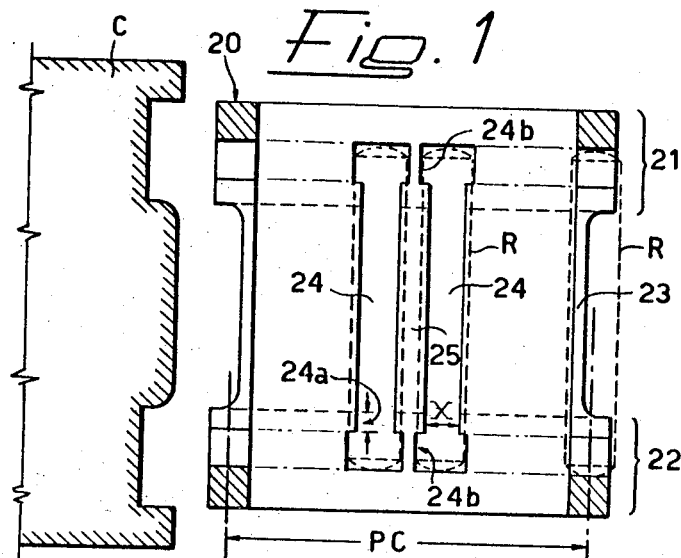
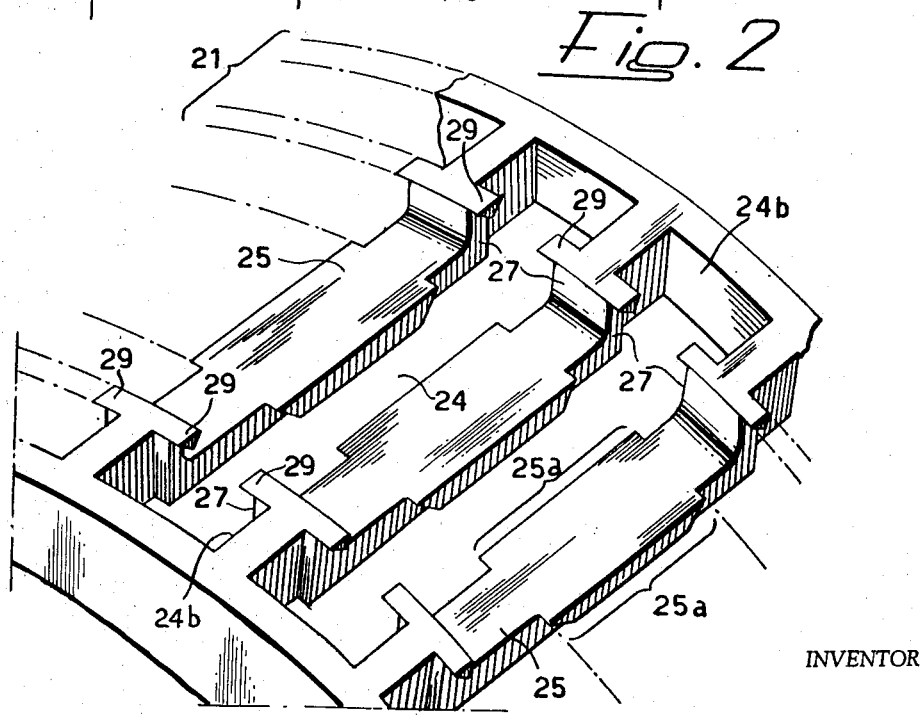
INVENTOR
Giacomo Einaudi, et al
BY Robert E. Burns
ATTORNEY

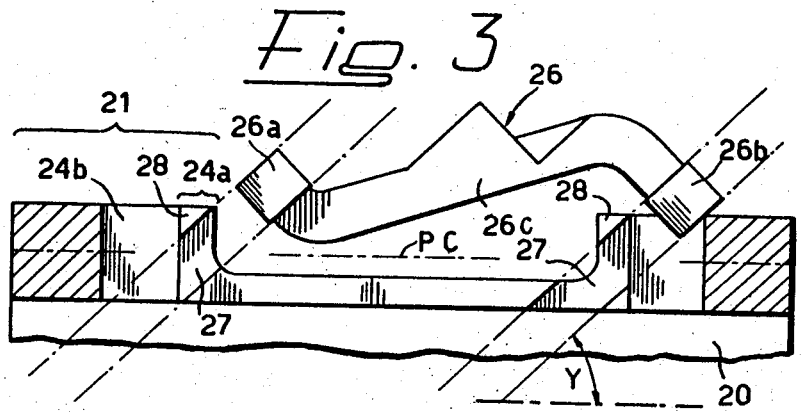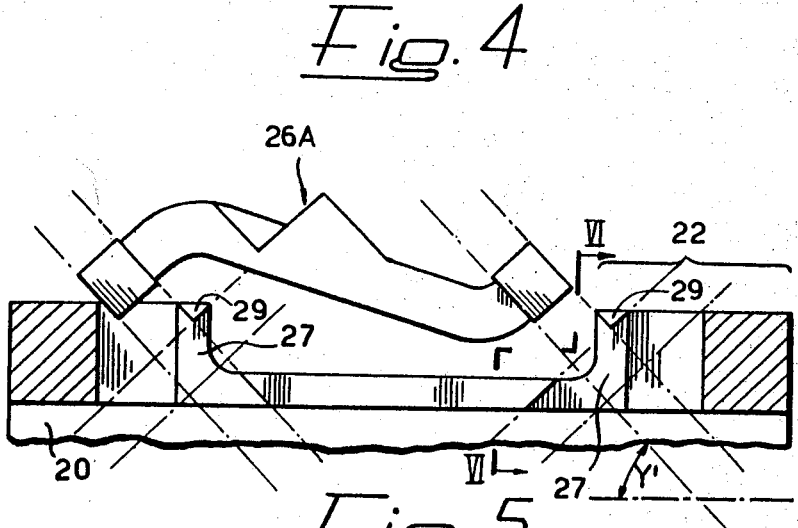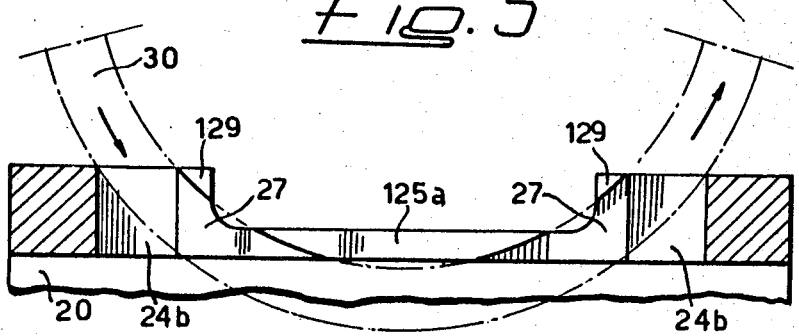

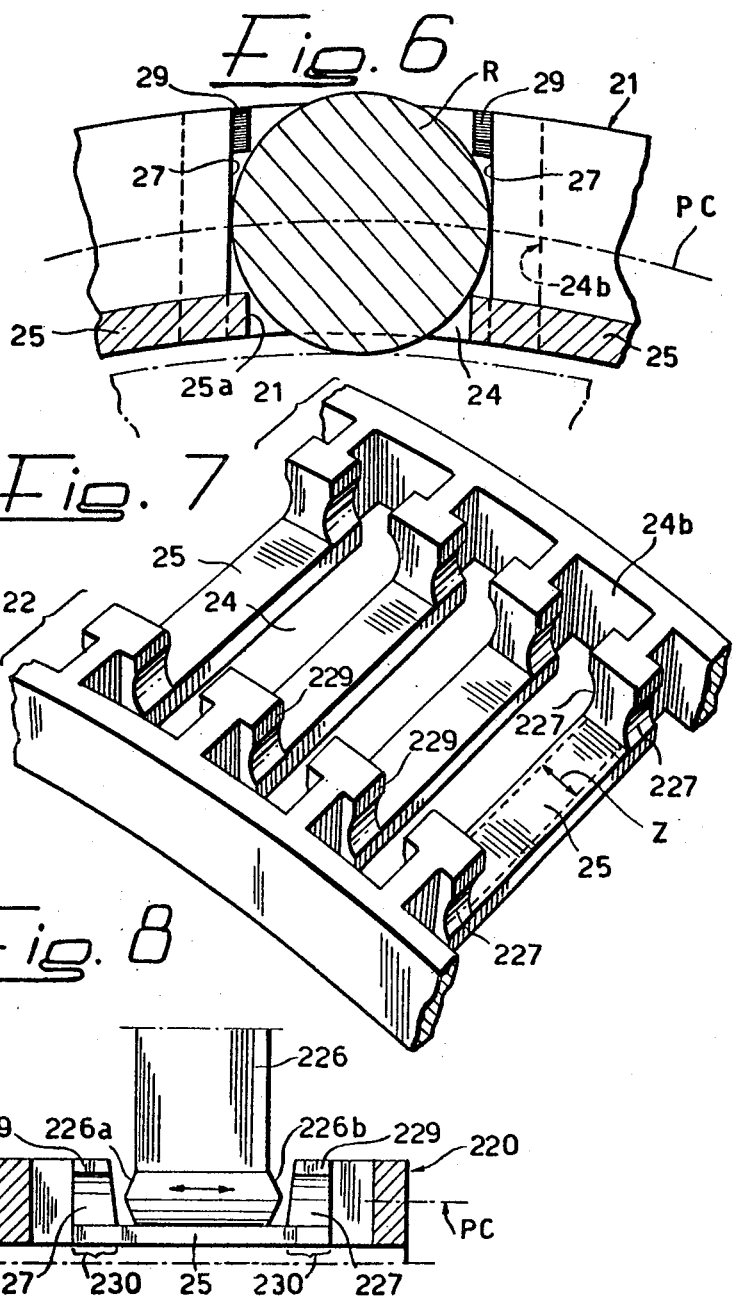

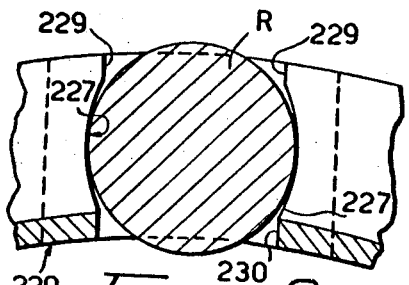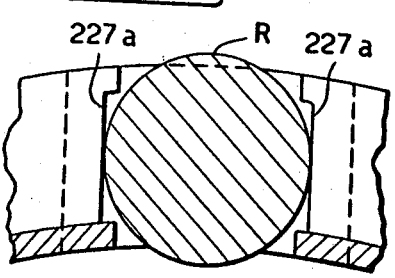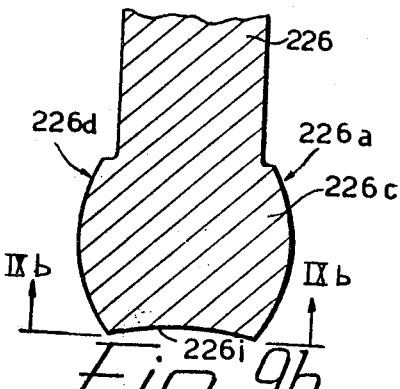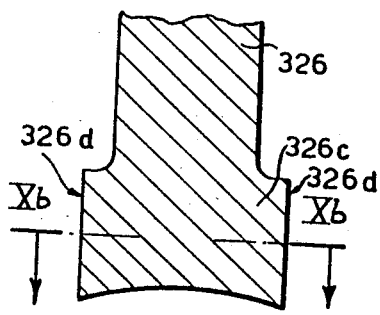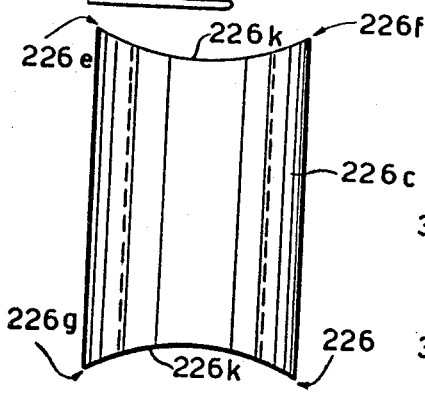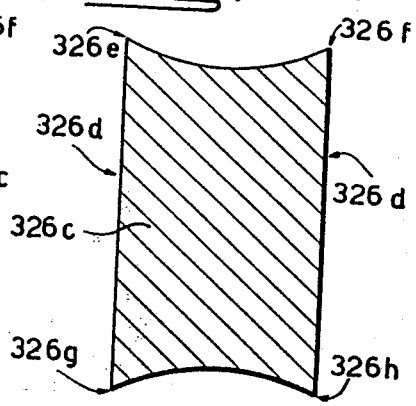

United States Patent Office 3,144,703
Patented Aug. 18, 1964

3,144,703
METHOD OF MANUFACTURING ROLL CAGES FOR NEEDLE BEARINGS
Giacomo Einaudi and Giuseppe Ficco, Turin, Italy, assignors to RIV Officine di Villar Perosa Societa per Azioni, Turin, Italy
Filed Nov. 20, 1962, Ser. No. 239,405
Claims priority, application Italy Nov. 25, 1961
5 Claims. (Cl. 29—148.4)

This invention relates to cages for needle bearings of the character comprising a pair of crown sections integral with and interconnected by roll-separating bars defining roll-windows therebetween, and wherein each of the windows is formed at locations adjacent its end portion with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage.

It is to be understood that the "pitch cylinder" is herein intended to mean the imaginary cylindrical surface containing the axes of the rolls in assembled condition of the bearing, and that said surface is concentrical with the cage and comprised within the radial thickness of the crown sections of the cage, as is known in the art.

Contrarily to more or less conventional roller bearings, in which the bearing rollers are substantially "self-steering" owing to their limited length-to-diameter ratio, needle bearings require precision-made cages capable of exactly guiding the rolls on their assigned axial planes, i.e. in planes containing the general axis of the bearing. An imperfect parallelism (skewing) of the rolls in a needle bearing leads first to a reduced mechanical efficiency and then to breakage of the rolls.

In a cage of the character described hereinbefore, each of the rolls is circumferentially located and guided by said pairs of "chordal surfaces," i.e. surfaces which are symmetrical to each other with respect to the axial plane assigned to a roll and are generally planar and located on corresponding chordal planes parallel to said axial plane.

It is extremely important to form said chordal surfaces as exactly as possible and to not incidentally deform said surfaces during the manufacturing steps in which the radial retaining means for the rolls are formed on the cage. According to the conventional practice, the radially inner retaining means are usually formed during the punching step in which the windows in the cage are punched out, whereas the radially outer retaining means are formed by locally plastically deforming the bars in the cage. Since the retaining means are more or less closely adjacent the chordal surfaces, there is a substantial risk of deforming said surfaces when a plastically deforming local pressure or blow is applied to the bars for forming the radially outer retaining means. As a consequence, the subsequent snap-insertion of the rolls in their respective windows becomes difficult or impossible and the rolls are subjected to "skewing" in use of the bearing.

A primary object of this invention is to fully avoid any plastic deformations of the cage material when forming the radial retaining means. A more particular object of the invention resides in providing a manner of forming the retaining means by machining operations, i.e. by employing precision-cutting tools capable of assuring a high-precision output.

On the other hand, many synthetic plastics possess valuable anti-wear properties but cannot be used for needle bearing cages due to their unsatisfactory cold-flow properties so that the radial retaining means cannot be formed by plastic deformation without unduly deforming the chordal surfaces. Unfortunately, also the plasticity temperature interval of such plastics is extremely narrow and does not permit for an easy temperature control when heat-plastic local deformation is attempted to form the retaining means on the cage. Yet, such materials (fluorocarbon resins, polyamides, etc.) are easily machinable. Thus, a further object of this invention resides in providing a cage-manufacturing method which will permit application of the above synthetic plastics in the instant art.

Thus, referring to solid cages of the character set out in the introductory paragraph of this description, the method of this invention is characterized by the steps of: forming a cage blank with the roll-windows extending into each of the crown sections by a pre-end portion of a width smaller than the roll diameter followed by an end section of a width greater than said diameter, and slotting the flanks of each of said pre-end portions of each window over a radially limited extent to thereby form the chordal surfaces.

Further details, characteristic features and advantages of this invention will result from the following description, wherein reference is made to the accompanying drawings in which:

FIGURE 1 is a schematical cross-sectional view showing a cage blank and a corresponding turning-tool profile;

FIGURE 2 is a fragmentary perspective view of a finished cage;

FIGURES 3 and 4 are mutually similar cross-sectional part-views showing a manner of machining the chordal surfaces by means of a slotting tool;

FIGURE 5 is a cross-sectional part-view similar to those of FIGS. 3 and 4, showing another manner of machining the chordal surfaces;

FIGURE 6 is a fragmentary cross-sectional view on line VI—VI of FIG. 4, with a roll snap-fitted into its window in the cage;

FIGURE 7 is a fragmentary perspective view of another cage obtainable by this invention;

FIGURE 8 is a cross-sectional part-view similar to those of FIGS. 3–5 showing a manner of obtaining the cage shown in FIG. 7;

FIGURE 9 is a view similar to that of FIG. 6 but relating to the cage shown in FIG. 7;

FIGURE 9a is a cross-sectional view of a slotting tool employed for manufacturing the cage of FIG. 7;

FIGURE 9b is a view on line IXb—IXb of FIG. 9a;

FIGURE 10 is a view similar to that of FIG. 9, showing planar chordal surfaces;

FIGURE 10a is a cross-sectional view of a slotting tool employed in connection with FIG. 10; and FIGURE 10b is a cross-sectional view on line Xb—Xb of FIG. 10a.

It will be easily understood by experts that the most important problem connected with this invention is to render the machining (slotting) of the chordal surfaces practically feasible, since, considering the conventional cages, such surfaces are unaccessible by conventional tools after the radial retaining means have been formed.

This invention solves the problem, first by suitably shaping the windows and crown-sections on the cage blank, and then slotting specific portions of the flanks of each window to simultaneously obtain both a chordal surface and radial retaining means for the respective roll.

Thus, for performing this invention a cage blank is required having a pair of crown sections. The manner of forming such a blank is not critical. The apparently best way is to turn the inner and/or outer surfaces of a solid bushing to a desired profile by means of a profile-cutter. In the most convenient embodiment, shown in FIG. 1, the blank 20 has been turned over its entire outer circumferential surface by radially feeding a profile-cutter C, the inner circumferential surface of the blank being cylindrical of a constant diameter. The just turned blank comprises a pair of solid crown sections 21, 22, integral with and interconnected by a reduced-diameter web section 23 which is radially off-set to the inside with respect to the pitch cylinder PC of the cage. The expedient of radially off-setting a central section of a cage is known per se in the art, and it is practically immaterial both in the prior art and in this invention whether the off-set is to the inside or to the outside of the pitch diameter PC; it is, however, true that off-setting to the inside (as shown in FIG. 1) facilitates both turning and some subsequent steps.

The turned cage blank is now radially punched to obtain roll windows therein. Some only, of such windows are shown and indicated by 24 in FIG. 1. It will be seen that each of the windows extends longitudinally across the web section 23 and into the crown sections 21, 22. It is to be pointed out that each of the windows axially extends into the crown sections by a pre-end portion 24a the width X of which is somewhat smaller than the diameter of the rolls R for which the cage is being manufactured, said pre-end portion 24a being followed by an end portion 24b, the width of which is greater than the roll diameter. The width of that window portion which is co-extensive with the web section 23 (hence with the bars 25 interconnecting the two crown sections 21, 22) is shown to be equal to X; such width can be, however, somewhat greater than X and than the roll diameter, if desired, depending upon the embodiment of this invention which will be selected for subsequent machining of the chordal surfaces. The purpose of the widened end portions 24b of the windows 24 mainly resides in permitting a passage or a penetration of a machining tool and discharge of shavings or fillings, as will be seen hereinafter.

A best manner of obtaining the chordal surfaces by machining is to simultaneously slot both flanks on both pre-end portions of each window. To that end, a blank as shown in FIG. 1 is placed on an indexing head (not shown on the drawings), having associated therewith a slotting tool such as 26 (FIG. 3) arranged for being reciprocated in a plane containing the axis of the indexing head. The direction of reciprocation is inclined to said axis by an angle Y smaller than 90°. The blank is preliminarily angularly adjusted on the indexing head to bring the longitudinal mid-axis of a window 24 on the reciprocation plane.

The tool 26 has a pair of cutting heads 26a, 26b, rigidly connected to each other by a shank 26c. The thickness of the latter is smaller than the width value X, so that the shank can pass freely though the window, whereas each of the cutting heads 26a, 26b, is a twin-edged bilaterally-working cutter the effective thickness of which is substantially equal to the roll diameter (with a limited plus allowance). Other geometrical relations clearly result from FIG. 3. On advancing the tool 26 towards the cage obliquely to the cage axis, each of the cutting heads 26a, 26b, hobs a slot simultaneously in each of the two opposite flanks of the respective pre-end portion 24a of the window over a radially limited extent, so that a chordal surface 27 is formed on each flank and, owing to the above-mentioned allowance, the two companion chordal surfaces at each pre-end portion of the window are spaced therebeween through a distance just slightly greater than the roll diameter, so that a roll will be smoothly guided between such companion surfaces. Each of the cutting heads leaves intact on each of the window flanks a triangular protuberance 28, which is radially off-set to the outside with respect to the pitch cylinder PC.

The tool 26 is then withdrawn and the cage is indexed for a subsequent cutting stroke through a subsequent window, and so on.

The radial dimension of the triangular protuberances mainly depends on the inclination angle Y; the smaller the angle Y, the smaller is said dimension. However, small inclination angles Y will require substantial axial lengths of the end portions 24b of the window allowing for a free passage of the cutting heads 26a, 26b through said portions. Thus, should the radial dimension of the protuberances 28 result excessive, i.e. should the protuberances excessively invade their associated chordal surfaces 27 when a given minimum angle Y is adopted for a specific cage, the machining step by means of a slotting tool is advantageously repeated in an oppositely inclined direction. This is preferably accomplished by a further tool 26A (FIG. 4) associated with the above-mentioned indexing head, the tool 26A being identical to that 26 of FIG. 3 and the two tools being positioned for reciprocation on axial planes forming therebetween an angle which is a multiple (inclusive one) of the angular pitch of the windows in the cage. In this manner, as the tool 26 works in a window, the other tool 26A works in another window at an inclination angle Y' (FIG. 4) which is generally equal to Y but of opposite sign. The protuberances 28 of FIG. 3 are thus reduced by about half their radial dimension and take each a form of an inverted isosceles triangle 29 (FIG. 4) having its base side on the outer circumferential surface of its respective crown section 21, 22.

A portion of a so machined cage is shown in FIG. 2 which, taken together with FIG. 6, depicts both the shape of the cage and roll arrangement in a window. The protuberances 29, which are circumferentially directed and adjacent from the outside to the respective chordal surfaces 27, provide radially outer retaining means for the rolls R. The radially inner retaining means consist in this case of that portions 25a which have been left intact on the opposite flanks of each bar 25 by the slotting tools.

It is to be understood that, in practice, both the portions 25a and protuberances 29 project into the windows to an extremely small extent, just necessary for radially retaining the rolls in the cage yet allowing or snap-inserting the rolls in their windows as is customary in the art. So, for example, with rolls of, say, 3 mm. diameter, the projection extent amounts to about 0.2–0.3 mm. or even less, depending on the elastic deformability of the material of which the cage is made.

FIGURE 5 shows a possibility of employing a grinding wheel instead of the slotting tools shown in FIGURES 3 and 4. The grinding wheel is of a conventional flat-cup shape, the effective annular zone of which is denoted by 30 in FIG. 5. The thickness of the grinding wheel is smaller than the width X (FIG. 1), whereby the wheel can be partly inserted into a window in the cage blank to a position shown in FIG. 5. It is to be understood that both the diameter of the wheel and the radial dimension of its effective zone are adapted to the geometry of the blank, so that, on rotation of the grinding wheel, the effective zone enters into the window through one of the wide ends 24b of the window and issues through the opposite wide end. By applying an axial feed to the grinding wheel (i.e. a feed directed perpendicularly to the plane of FIG. 5), the effective grinding zone 30 cuts into a flank of the window leaving intact protuberances 129 and 125a (performing the function of the items 29 and 25a, respectively, of FIGS. 2–4). This embodiment of the invention is, however, less advantageous of that previously described, as will be readily apparent to the experts.

Referring now to FIGS. 7 and 8, the cage shown in FIG. 7 is obtainable from a blank 220, which is substantially identical to the blank 20 of FIG. 1. The only substantial difference, with respect to the manufacturing steps described with reference to FIGS. 1–4, resides in that the inclination angle Y (FIGS. 3 and 4) is nil (zero) in FIG. 8. This means that the slotting tool is to be reciprocated in a direction parallel to the axis of the cage. To this end, the tools 26, 26A, previously described, are replaced by a single slotting tool 226 the cutting head of which extends axially of the cage and ends by twin-edged cutter portions 226a, 226b. By reciprocating the tool 226 once to the right and once to the left from the central position shown in FIG. 8, each of the two pre-end portions of a window is slotted simultaneously on its two flanks. The bottom of each slot forms a chordal surface 227 for guiding a roll, and the width of the slot (as measured radially of the cage) is limited so as to leave intact a circumferentially projecting protuberance 229 (corresponding to 29 in FIG. 4) which is radially off-set to the outside with respect to the pitch cylinder PC. The tool head leaves also intact a radially inner zone 230 on each pre-end flank of a window, the zone 230 being radially off-set to the inside with respect to the pitch cylinder PC. In the embodiment shown, the tool head "sweeps" by its bottom parts the bars 25 of the cage, so that the zones 230 actually form opposite-end extensions of the longitudinal edges of the bars. The radially inner retaining means for the rolls comprise therefore both the bar edges and zones 230. However, since the zones 230 alone are fully sufficient for retaining the rolls, it is evident that the co-operation of the bar edges to that purpose is optional. Thus, if desired, the width of the bars may be reduced e.g. to that indicated by Z in FIG. 7, which means that (as previously stated with reference to FIG. 1), the width of that portion of each window which is co-extensive with the bars can be greater than the value X relating to the width of the pre-end portions of the windows.

It will be seen that the "chordal" surfaces 227 in FIGS. 7 and 8 are somewhat curved cylindrically towards each other. It will be readily understood that the profile of such surfaces directly depends on the slotting tool profile, which is advantageous for the versatility of this invention.

FIG. 9, which relates to the embodiment shown in FIG. 7, shows how the surfaces 227 slightly embrace therebetween the roll R to thereby better locate the latter in the cage. The curvature of the surfaces 227 is relatively small, for it must be always borne in mind that the roll is to be (or has been) snap-inserted into the cage. FIGURES 9a and 9b, relating to the tool 226 of FIG. 8, show the head 226c of the tool having cylindrically curved flanks 226d corresponding to the profile of the surfaces 227. The cutting head has twin-edged ends: a pair of edges 226e, 226f, is formed on one end and a further pair of edges 226g, 226h, is formed on the opposite end of the cutting head. The bottom 226i of the head does not cut and this is the reason wherefor the slotting tools of this character are termed herein "bilaterally-working" tools. The opposite end surfaces 226k of the cutting head are cylindrically concave to thereby provide the necessary cutting angles for the cutting edges. Since sharpening of the tool is performed on the end surfaces 226k, the cross-sectional profile (FIG. 9a) of the cutting head remains constant over the whole useful life of the tool.

The modification shown in FIG. 10 differs from the embodiment shown in FIGS. 7–9 in that the chordal surfaces 227a for the roll R are planar as in FIG. 6 and are obtained by axially reciprocating a slotting tool 326 (FIGS. 10a and 10b) in the manner described with reference to FIG. 8, the tool head 326c having straight flanks 326d and four cutting edges 326e, 326f, 326g and 326h.

It is to be understood that the invention is not limited to the specifically shown and described embodiments.

What we claim is:

1. Method of manufacturing a cage for a needle bearing of the character comprising a pair of crown sections integrally interconnected by roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage, said method comprising the steps of: forming a cage blank with the roll-windows extending into each of the crown sections by a pre-end portion of a width smaller than the roll diameter followed by an end section of a width greater than said diameter permitting passage of a machining tool through the section; and slotting the flanks of each of said pre-end portions of each window over a radially limited extent by passing the tool through the respective end sections to thereby form said chordal surfaces.

2. Method of manufacturing a cage for a needle bearing of the character comprising a pair of crown sections integrally interconnected by roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage, said method comprising the steps of: providing a cage blank comprising a pair of crown sections integral with and interconnected by a web section of a reduced thickness radially off-set to one side with respect to the pitch cylinder; forming said blank with the roll-windows extending through said web section and also extending into each of the crown sections by a pre-end portion of a width smaller than the roll diameter followed by an end section of a width greater than said diameter permitting passage of a machining tool through the section; and slotting the flanks of each of said pre-end portions of each window over a radially limited extent by passing a slotting tool through the respective end sections to thereby form said chordal surfaces while leaving intact on each of said flanks a region radially off-set to the other side with respect to the pitch cylinder.

3. Method of manufacturing a cage for a needle bearing of the character comprising a pair of crown sections integrally interconnected by roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage, said method comprising the steps of: providing a cage blank comprising a pair of crown sections integral with and interconnected by a web section of a reduced thickness radially off-set to one side with respect to the pitch cylinder of the cage; forming said blank with the roll-windows of a width smaller than the diameter of the rolls, each of said windows extending into each of the crown sections by a pre-end portion having the said width followed by an end section having a width greater than said diameter permitting passage of a machining tool through the section; and slotting the flanks of each of said pre-end portions of each window over a radially limited extent by passing a slotting tool through the respective end sections to thereby form said chordal surfaces while leaving intact on each of said flanks a region radially off-set to other side with respect to the pitch cylinder.

4. Method of manufacturing a cage for a needle bearing of the character comprising a pair of crown sections integrally interconnected by roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage, said method comprising the steps of: providing a cage blank comprising a pair of crown sections integral with and interconnected by a web section of a reduced thickness radially off-set to one side with respect to the pitch cylinder; forming said blank with the roll-windows extending through said web section and also extending into each of the crown sections by a pre-end portion of a width smaller than the roll diameter followed by an end section of a width greater than said diameter permitting passage of a slotting tool through the section; and slotting the flanks of each of said pre-end portions of each window over a radially limited extent by reciprocating a slotting tool through the respective end sections and across a radially limited part of each flank being machined in a direction forming an angle of less than 90° with the axis of the cage to thereby form said chordal surface while leaving intact on said each flank a region radially off-set to the other side with respect to the pitch cylinder.

5. Method of manufacturing a cage for a needle bearing of the character comprising a pair of crown sections integrally interconnected by roll-separating bars defining roll-windows therebetween, and wherein each of the windows is formed at locations adjacent its end portions with a pair of chordal surfaces for guiding a respective roll on its assigned axial plane of the cage, each of said chordal surfaces having adjacent thereto a pair of circumferentially directed projections located at radially opposite sides of the pitch cylinder of the cage for radially retaining the rolls in the cage, said method comprising the steps of: providing a cage blank comprising a pair of crown sections integral with and interconnected by a web section of a reduced thickness radially off-set to one side with respect to the pitch cylinder; forming said blank with the roll-windows extending through said web section and also extending into each of the crown sections by a pre-end portion of a width smaller than the roll diameter followed by an end section of a width greater than said diameter permitting passage of a slotting tool through the section; and slotting the two flanks simultaneously of each of said pre-end portions of each window over a radially limited extent by positioning a twin-edged slotting tool on the axial mid-plane of the window and reciprocating the tool through the respective end sections and across the two flanks in a direction forming an angle of less than 90° with the axis of the cage to thereby form said chordal surfaces while leaving intact on each of the two flanks a region radially off-set to the other side with respect to the pitch cylinder.

References Cited in the file of this patent
UNITED STATES PATENTS

| | | |
|---|---|---|
| 2,327,237 | Baden | Aug. 17, 1943 |
| 2,591,160 | Kilian | Apr. 1, 1952 |
| 2,876,529 | Palmgren | Mar. 10, 1959 |